Jan. 7, 1930. M. C. ROWLEY 1,742,415
ELECTROPNEUMATIC BRAKE
Filed May 15, 1928
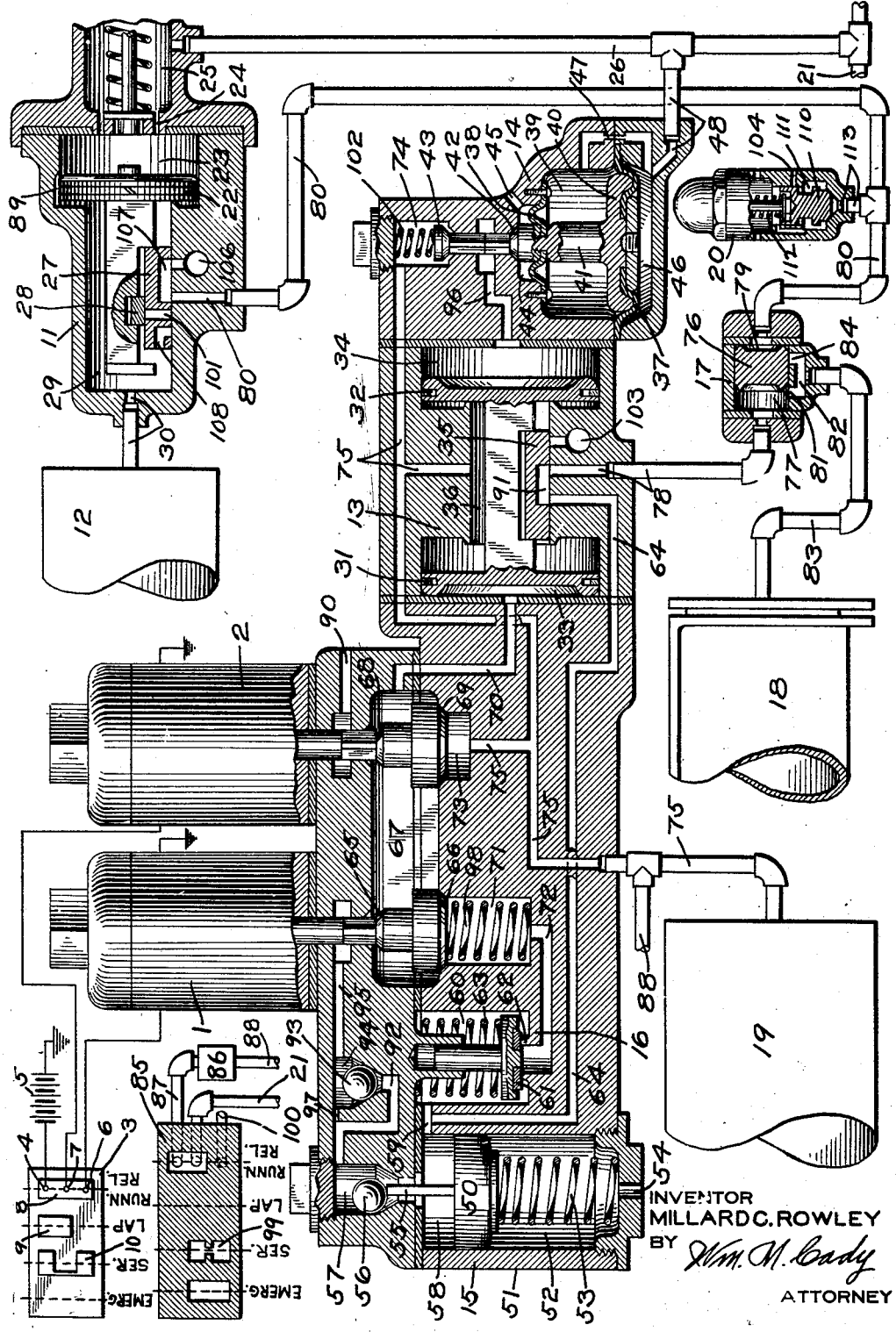
INVENTOR
MILLARD C. ROWLEY
BY Wm. M. Cady
ATTORNEY Patented Jan. 7, 1930

1,742,415

UNITED STATES PATENT OFFICE

MILLARD C. ROWLEY, OF WILLIAMSPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed May 15, 1928. Serial No. 277,880.

This invention relates to electro-pneumatic brakes and has for its principal object to provide an improved electropneumatic brake equipment which may be controlled either electrically or pneumatically.

Another object of my invention is to provide a brake equipment of the above type in which the brakes may be pneumatically released after an electric application and which may then be operated pneumatically.

A further object of my invention is to provide a brake of the above type with means for preventing fluid under pressure from the brake cylinder from overcharging the auxiliary reservoir when the brake equipment is changed from electric to pneumatic control.

These and other ojects will appear in the following more detailed description of my invention.

In the accompanying drawing, the single figure is a diagrammatic view of an electromagnetic brake equipment embodying my invention.

According to my invention, two magnets, 1 and 2 are provided, each of which has one terminal connected to ground. For the purpose of controlling the operation of the brake equipment electrically, an electric switch device 3 is provided having a contact terminal 4 which is connected to one terminal of a battery 5 or other electric current supply source, a contact terminal 6 connected to one terminal of the magnet 1, and a contact terminal 7 connected to one terminal of the magnet 2.

In the running and release position of the brake switch device 3, the battery 5 is connected, by a connector 8, so as to complete a circuit through both magnets 1 and 2 and ground, thus energizing said magnets. In the lap position of the brake switch, the battery 5 is connected, by a connector 9 so as to complete a circuit through the magnet 2 and ground, thus energizing said magnet. In the service position of the switch, the battery is connected, by a connector 10, so as to complete a circuit through the magnet 1 and ground, thus energizing said magnet. In the emergency position of the switch the battery circuit is open so that both magnets are de50 energized.

The magnets 1 and 2 are associated with an electropneumatic valve mechanism having a pneumatic portion or triple valve device 11, an auxiliary reservoir 12, a change-over valve device 13, a change-over pilot valve device 14, a service brake cylinder limiting valve device 15, a check valve device 16, a double check valve device 17, a brake cylinder 18, a main reservoir 19, a relief valve device 20, and a brake pipe 21.

The triple valve device 11 may be of any desired type and as shown in the drawing may comprise a piston 22 contained in a piston chamber 23, which chamber is connected to the brake pipe 21 by passage 24, graduating spring chamber 25 and pipe 26. A main slide valve 27 and a graduating slide valve 28, contained in a valve chamber 29, are adapted to be operated by the piston 22, the valve chamber 29 being connected to the auxiliary reservoir 12 through passage and pipe 30.

The change-over valve device 13 comprises connected pistons 31 and 32 contained in respective piston chambers 33 and 34 and a slide valve 35 contained in a valve chamber 36 and adapted to be operated by said pistons.

The change-over pilot valve device 14 may comprise spaced flexible diaphragms 37 and 38, the area of the diaphragm 37 being greater than that of the diaphragm 38. Contained in the chamber 39 between the diaphragms 37 and 38 is a follower member having a plate 40 secured to the diaphragm 37 and having a stem 41 secured to the diaphragm 38, which diaphragms are adapted to operate double beat valves 42 and 43, the valve 42 being contained in a valve chamber 44 at one side of the diaphragm 38, which chamber is connected, at all times, to atmosphere through an atmospheric passage 45. The chamber 39 is connected to the chamber 46 by a restricted passage 47, and both chambers 39 and 46 are connected to the brake pipe 21 through a passage and pipe 48 and pipe 26.

The service brake cylinder limiting valve device 15 comprises a piston 50 contained in a cylinder 51. The chamber 52 at one side of the piston 50 is open, at all times, to atmosphere through passage 54, which chamber contains a spring 53, the pressure of which spring tends to maintain the piston in its normal position, as shown in the drawing. Extending upwardly from the piston 50 is a stem 55 which is adapted to be operated by the piston to control the seating and unseating of a ball valve 56 contained in a chamber 57 for controlling communication of this chamber with the chamber 58 at one side of the piston 50.

The chamber 58 is connected by a passage 59 to a chamber 60 containing a check valve 61 adapted to seal against a seat ring 62 and also containing a spring 63, the pressure of which spring tends to maintain the check valve seated. This passage 59 is connected to a passage 64 leading to the seat of the slide valve 35 of the change-over valve device 13.

The magnet 1 is adapted to control the operation of double beat valves 65 and 66 contained in a valve chamber 67, while the magnet 2 is adapted to control the operation of double beat valves 68 and 69 also contained in the valve chamber 67, which chamber is connected to the chamber 33 of the change-over valve device 13 by a passage 70. Beneath the valve 66 is a chamber 71 from which a passage 72 leads on the inner seated area of the check valve 61.

The main reservoir 19 is connected to a chamber 73, beneath the valve 69, to the slide valve chamber 36 of the change-over valve device 13 and to the chamber 74 containing the relay valve 43 by pipe and passages 75.

The double check valve device 17 comprises a cylinder containing a check valve 76, the chamber 77 at one side of the valve being connected to a pipe and passage 78 leading to the seat of the slide valve 35 of the change-over valve device 13. The chamber 79 at the other side of the check valve is connected through a pipe and passage 80 leading to the seat of the main slide valve 27 of the triple valve device 11. The check valve 76 is operative at one time to connect the chamber 77 to the brake cylinder 18 through a port 81, passage 82 and pipe 83, and is operative at another time to connect the chamber 79 to the brake cylinder through a port 84, passage 82 and pipe 83.

The relief valve device 20 is connected to the pipe 80 intermediate the triple valve device 11 and the double check valve device 17 and may comprise a valve 110 contained in a valve chamber 111 which is vented to the atmosphere through a passage 104. Contained in the chamber 111 is a spring 112 tending to maintain the valve seated. Leading from the pipe 80 to the seated area of the valve 110 is a pipe and passage 113.

For the purpose of controlling the pneumatic operation of the brakes, a brake valve device 85 may be provided which may be of the usual type and which is shown diagrammatically in the drawing. In its running position, as shown in the drawing, the brake valve connects the brake pipe 21 to the feed valve 86 through a pipe 87, the feed valve being connected to the main reservoir pipe 75 by a pipe 88.

In operation, with the brake switch 3 in the running and release position, and the brake valve device 85 in running and release position, the brake pipe 21 is charged with fluid under pressure from the main reservoir 19 through pipes 75 and 88, feed valve 86, pipe 87 and brake valve device 85, and fluid under pressure is supplied from the brake pipe to the piston chamber 23 of the triple valve device 11 through pipe 26, chamber 25 and passage 24, moving the piston 22 to its normal release position, as shown in the drawing. In this position, fluid is supplied from the piston chamber 23 to the valve chamber 29 through the usual feed groove 89, and from said valve chamber to the auxiliary reservoir 12 through passage and pipe 30. The diaphragm chamber 46 of the change-over pilot valve device 14 is also supplied with fluid under pressure from the brake pipe through pipe 26 and pipe and passage 48, and from said chamber 46 to the chamber 39 through the restricted passage 47. When the pressures on both sides of the diaphragm 37 become substantially equal, the pressure of fluid in chamber 39 acts on the small diaphragm 38 and moves it upwardly, seating the valve 42 and unseating the relay valve 43.

When the brake switch is in running and release position, both magnets 1 and 2 are energized so that valves 65 and 68 are held unseated and the valves 66 and 69 seated so that the chamber 67 is vented to the atmosphere past the unseated valve 68 and through an atmospheric passage 90, and as the piston chamber 33 is connected to the chamber 67 by passage 70, said chamber 33 is maintained at atmospheric pressure. The brake cylinder 18 is also maintained at atmospheric pressure by reason of its connection to the chamber 67 through pipe 83, passage 82 of the double check valve device 17, port 81, valve chamber 77, pipe and passage 78, a cavity 91 in the slide valve 35 of the change-over valve device 13, passages 64 and 59, piston chamber 58, past the normally open valve 56, valve chamber 57, passage 92, past a ball check valve 93, check valve chamber 94, passage 95, and past the unseated valve 65.

With the valve 69 seated, fluid under pressure from the main reservoir 19 is supplied to the chamber 73 beneath the valve 69 and the valve chamber 36 of the change-over valve device 13, by way of pipe and passage 75. The piston chamber 34 of the change-over value device is supplied with fluid under pressure from the passage 75 through valve chamber 74, past the unseated relay valve 43 and through a passage 96. As the piston chamber 33 is vented to the atmosphere the pressure of fluid in piston chamber 34 acting on the face of the piston 32 will maintain both pistons and slide valve 35 in their normal positions, as shown in the drawing, in which position of the slide valve, the brake cylinder 18 is vented to the atmosphere as hereinbefore described.

In controlling the brakes electrically, by the use of the brake switch device 3, the brake valve device 85 is not operated and is maintained in its running position as shown in the drawing.

If it is desired to effect an electric service application of the brakes, the brake switch 3 is turned to service position, in which the magnet 2 is deenergized and the magnet 1 remains energized. The magnet 2 being deenergized, fluid under pressure in the chamber 73 supplied from the main reservoir 19, through pipe and passage 75, will cause the valve 69 to unseat and the valve 68 to seat, the seating of the valve 68 closing off communication of the chamber with the atmosphere by way of the atmospheric passage 90. Since the magnet 1 is energized, the valve 66 will be seated and the valve 65 unseated, so that fluid under pressure flowing past the unseated valve 69 will flow past the unseated valve 65 to the brake cylinder 18 through passage 95, valve chamber 94, a restricted passage 97, passage 92, valve chamber 57, past the open ball valve 56 into the piston chamber 58 of the service limiting valve device and from thence through passages 59 and 64, cavity 91 in the slide valve 35 of the change-over valve device, passage and pipe 78, valve chamber 77 of the double check valve device, port 81, passage 82 and pipe 83. It will be noted that fluid under pressure is also supplied to the piston chamber 33 of the change-over valve device by way of passage 70, but so long as the pressure is maintained on the face of the piston 32, the change-over valve device is maintained in its left hand position, as shown in the drawing.

If it is desired to effect a full service application of the brakes, the brake switch 3 is maintained in service position, and when a predetermined brake cylinder pressure has been attained, the pressure of fluid in the chamber 58 will cause the piston 50 of the limiting valve device 15 to move downwardly against the pressure of the spring 53. As the piston 50 moves downwardly, the stem 55 moves with it out of supporting engagement with the ball valve 56 and permits the valve to seat, thus closing off the further supply of fluid under pressure to the brake cylinder.

Should it be desired to effect a service application of the brakes, less than a full service application, the brake switch is held in service position until the desired brake cylinder pressure is attained, when the brake switch is moved to lap position, in which position the magnet 2 is energized and the magnet 1 deenergized. The energization of the magnet 2 operates to seat the valve 69, so that further flow of fluid under pressure to the valve chamber 67 is cut off, and operates to unseat the valve 68, so that fluid under pressure in this chamber is vented to the atmosphere through the atmospheric passage 90. Upon the deenergization of the magnet 1, the pressure of a spring 98 will cause the valve 66 to unseat and the valve 65 to seat. The seating of the valve 65 prevents the flow of fluid under pressure from the passage 95 to the chamber 67, while the seated check valve 61 prevents the flow of fluid to the chamber 67 by way of the passage 72 and chamber 71, thus it will be noted that the fluid pressures in the brake cylinder is bottled up.

If it is desired to release the brakes, the brake switch is moved to the running and release position in which both of the magnets 1 and 2 are energized so that the valves 65 and 68 are unseated and the valves 66 and 69 are seated. Fluid under pressure in the brake cylinder 18 is then vented to the atmosphere through pipe 83, passage 82, port 81, valve chamber 77 of the check valve device 17, pipe and passage 78, cavity 91 of the slide valve of the change-over valve device 13, passages 64 and 59, piston chamber 58 of the service brake cylinder pressure limiting valve device 15, raising the ball valve 56 and through valve chamber 57, passage 72, raising the check valve 93, then through valve chamber 94, passage 95, past the unseated valve 65, through valve chamber 67, past the unseated valve 68 and finally through the atmospheric passage 90. When the brake cylinder is thus vented, pressure of the spring 53 will cause the piston 50, of the service brake cylinder pressure limiting valve device, as well as the piston stem 55 to move upwardly to their normal positions, thus normally maintaining the valve 56 unseated.

To effect an emergency application of the brakes, the brake switch 3 is moved to emergency position, in which position, both magnets 1 and 2 are deenergized, so that the valve 66 will, due to the pressure of the spring 98, be unseated and fluid under pressure flowing from the main reservoir 19 through pipe and passage 75 and chamber 73, will unseat the valve 69 and seat the valve 68, the seating of the valve 68 closing off communication from the chamber 67 to the atmosphere through the passage 90. Fluid under pressure flows past the valve 66 into valve chamber 67 past the unseated valve 66 to chamber 71 and from thence through passage 72 to the inner seated area of the check valve 61. The pressure of the fluid in passage 72 causes the check valve 61 to be unseated against the pressure of the spring 63, so that fluid under pressure then flows through chamber 60 and from thence through passage 59 and 64 to the brake cylinder 18 in the same manner as in effecting a service application of the brakes. It will here be noted that in effecting an emergency application of the brakes the flow of fluid under pressure to the brake cylinder is substantially unrestricted, whereas in a service application fluid under pressure must flow through the restricted passage 97.

When it is desired to release the brakes after an electric emergency application, the brake switch is moved to running and release position, in which both of the magnets 1 and 2 will be deenergized, causing the apparatus to operate to release the brakes in the same manner as has been described in connection with the release of an electric service application of the brakes.

If, at any time and for any reason, the electric current supply should fail, both magnets 1 and 2 will be deenergized and an electric emergency application will be effected automatically in the same manner as when the magnets are deenergized by moving the brake switch to emergency position.

When an emergency application of the brakes has been effected due to the failure of the electric current supply, the brake switch 3 will, of course, be useless in controlling the release of the brakes and in order to release them, the brake valve 85 is used. In a case of this kind the brake valve is first moved to service position, in which the brake pipe 21 is vented to the atmosphere through the cavity 99 in the usual rotary valve of the brake valve device 85, and then through the atmospheric passage 100, thus effecting a reduction in brake pipe pressure. This reduction in brake pipe pressure operates to cause the pressure of fluid in the diaphragm chamber 46 of the pilot valve device 14 to reduce, so that the pressure of fluid in the chamber 39 acting on the flexible diaphragm 37 causes both diaphragms 37 and 38, follower 40, and stem 41 to move downwardly, thus unseating the pilot valve 42 and permitting the relay valve 43 to be seated by the pressure of a spring 102 contained in the valve chamber 74. By the seating of the valve 43, fluid at main reservoir pressure is cut off from the piston chamber 34 of the change-over valve device, and by the unseating of the pilot valve 42 permits fluid under pressure in this chamber to flow to the atmosphere through passage 96, diaphragm chamber 44 and atmospheric passage 45. Now as there is fluid under main reservoir pressure in the piston chamber 33 acting on the face of the piston 31 of the change-over valve device, both pistons 31 and 32 and the slide valve 35 will move to their right hand positions, in which the brake cylinder is vented to the atmosphere through pipe 83, passage 82, port 81, valve chamber 77 of the check valve device 17, pipe and passage 78, cavity 91 in the slide valve 35 and atmospheric passage 103. It will here be noted after the connected pistons 31 and 32 and slide valve 35 have moved to their right hand positions, fluid under pressure in the diaphragm chambers 39 and 46 of the pilot valve device will equalize through the restricted passage 47 and the pressure of fluid in the chamber 39, acting upon the small diaphragm 38, causes the pilot valve 42 to seat and the relay valve 43 to unseat, thus supplying fluid under pressure from the chamber 74 to the chamber 34.

This reduction in brake pipe pressure also operates to cause the triple valve piston 22, graduating slide valve 28 and main slide valve 27 to move toward the right to their service positions, in which positions a port 101 in the main slide valve connects the valve chamber 29 to the passage 80, so that fluid under pressure from the auxiliary reservoir 12 will flow through pipe and passage 30, valve chamber 29, port 101, passage and pipe 80 to the valve chamber 79 of the check valve device 17. Now as the chamber 77 at the other side of the check valve 76 is vented to the atmosphere, and the pressure in the chamber 79 becomes greater than the pressure in the chamber 77, the check valve 76 will be caused to move to its left hand position, thus closing off the port 81 and uncovering the port 84 and connecting the brake cylinder 18 with the auxiliary reservoir through the pipe 83, passage 82, port 84, valve chamber 79, pipe 80 and triple valve device 11.

When the brake cylinder 18 and the auxiliary reservoir are thus connected, the pressures therein equalize, and as the relief valve is set to operate at a predetermined degree below the normal brake pipe pressure, the valve 110 of the relief valve device will be caused to unseat, so that fluid under pressure from the pipe 80 will flow to the atmosphere through pipe 113, past the unseated valve 110, and through valve chamber 111 and atmospheric passage 104. The valve 110 remains unseated and fluid under pressure flows to the atmosphere until the equalized pressure is reduced to a predetermined degree below the normal brake pipe pressure when the pressure of the spring 112 will cause the valve 110 to seat, closing off further flow to the atmosphere.

The brake valve device 85 may now be moved to running and release position so as to recharge the brake pipe 21 and release the brakes in the usual manner.

It will here be noted that if the relief valve device 20 were omitted, the brakes could not be released pneumatically after an electric emergency application, for the reason that pressure of fluid in the brake cylinder, which has been supplied from the main reservoir is greater than that in the auxiliary reservoir 12, which has been supplied from the brake pipe 21, and when the check valve 76 is moved to the left, the pressure of the fluid in the brake cylinder would flow to the auxiliary reservoir and overcharge it, with the result that in recharging the brake pipe a sufficient differential could not be built up on the face of the triple valve piston 22 to cause it to move to release position against the equalized pressure of the auxiliary reservoir and brake cylinder.

If it is desired to release the brakes pneumatically after an intentional electric emergency application, the brake switch 3 may be maintained in emergency position and the release by the manipulation of the brake valve 85 will be the same as described in connection with the release of the brakes after an unintentional emergency application of the brakes. After an electric service application of the brakes or when the brake switch is in lap position, the brakes may be released pneumatically in the same manner as described in connection with the release of an emergency application.

Should it be desired to control the brakes electrically after they have thus been released pneumatically, the brake switch 3 is moved to running and release position, thus energizing both magnets 1 and 2, causing the valves 66 and 69 to seat and the valves 65 and 68 to unseat. With the valve 68 unseated, fluid under pressure in the piston chamber 33 of the change-over valve device will be vented to the atmosphere and the pressure of fluid in the piston chamber 34, supplied from the main reservoir 19, will cause the connected pistons and slide valve 35 to move to their left hand positions, in which the cavity 91 in the slide valve will again connect passages 64 and 78. Now when an application of the brakes is effected, the pressure of fluid flowing through the passage and pipe 78 will cause the check valve 76 to move again to its right hand position.

With the switch 3 in running and release position the change-over pistons and slide valve will be in their left hand positions, so that when the triple valve device is shifted to service position by effecting a reduction in brake pipe pressure in the usual manner, the service port 101 in the slide valve 27 registers with the passage 80 and fluid under pressure is supplied from the auxiliary reservoir and valve chamber 29 to passage and pipe 80 to the check valve chamber 79, causing the check valve 76 to move to left hand position and fluid under pressure in the chamber flows therefrom to the brake cylinder through port 84, passage 82 and pipe 83.

In the release position of the slide valve 27 the passage 80 is connected to the atmospheric passage 106 by the cavity 107 in the slide valve.

In an emergency application as effected pneumatically, the movement of the slide valve 27 to emergency position causes the passage 108 to register with the passage 80, so that fluid under pressure is supplied from the auxiliary reservoir 12 and valve chamber 29 to the brake cylinder.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a braking apparatus, the combination with a brake cylinder, a pressure source for supplying fluid at a high pressure to said brake cylinder and a pressure source for supplying fluid at a lower pressure to said brake cylinder, valve means adapted in one position to establish communication through which fluid is supplied to the brake cylinder from the first mentioned source and adapted in another position to establish communication through which fluid under pressure is supplied to the brake cylinder from the second mentioned source, and means for reducing the equalized brake cylinder and second mentioned fluid pressure supply source to a predetermined degree below the normal pressure of the second mentioned supply source when communication of the second mentioned supply source and brake cylinder is established after fluid under pressure has been supplied to the brake cylinder from the first mentioned supply source.

2. In a braking apparatus, the combination with a brake cylinder, of electrically controlled means for supplying fluid under pressure to the brake cylinder, pneumatically controlled means for supplying fluid under pressure to the brake cylinder, a brake pipe for supplying fluid under pressure to said pneumatically controlled means, valve means adapted in one position to establish communication through which fluid under pressure is supplied to the brake cylinder by operation of the electrically controlled means and adapted in another position to establish communication through which fluid under pressure is supplied to the brake cylinder by operation of the pneumatically controlled means, and means operative to reduce the equalized pressure of fluid from the brake cylinder and the pressure of fluid supplied by the pneumatically controlled means below the normal pressure of fluid in the brake pipe when communication is established between said brake cylinder and pneumatically controlled means.

3. In a braking apparatus, the combination with a brake cylinder, of electrically controlled means for supplying fluid under pressure to the brake cylinder, pneumatically controlled means for supplying fluid under pressure to the brake cylinder, a brake pipe for supplying fluid under pressure to said pneumatically controlled means, valve means adapted in one position to establish communication through which fluid under pressure is supplied to the brake cylinder by operation of the electrically controlled means and adapted in another position to establish communication through which fluid under pressure is supplied to the brake cylinder by operation of the pneumatically controlled means, and a valve device operative to reduce, to a predetermined degree, the equalized pressure of fluid from the brake cylinder and the pressure of fluid supplied by the pneumatically controlled means when communication is established between said brake cylinder and pneumatically controlled means.

4. In a braking apparatus, the combination with a brake cylinder, of electrically controlled means for supplying fluid under pressure to the brake cylinder, pneumatically controlled means for supplying fluid under pressure to the brake cylinder, a brake pipe for supplying fluid under pressure to said pneumatically controlled means, valve means adapted in one position to establish communication through which fluid under pressure is supplied to the brake cylinder by operation of the electrically controlled means and adapted in another position to establish communication through which fluid under pressure is supplied to the brake cylinder by operation of the pneumatically controlled means, and means operative to maintain the equalized pressure of fluid from the brake cylinder and the pressure of fluid supplied by the pneumatically controlled means below the normal pressure of fluid in the brake pipe when communication is established between said brake cylinder and pneumatically controlled means.

5. In a braking apparatus, the combination with a brake cylinder, of electrically controlled means for supplying fluid under pressure to the brake cylinder, an auxiliary reservoir, a brake pipe, a triple valve device operative upon a reduction in brake pipe pressure for supplying fluid under pressure from said auxiliary reservoir to said brake cylinder, valve means adapted in one position to establish communication through which fluid under pressure is supplied to said brake cylinder by the operation of said electrically controlled means and adapted in another position to establish communication through which fluid under pressure is supplied to said brake cylinder by said auxiliary reservoir through the operation of the triple valve device upon a reduction in brake pipe pressure, and means operative to reduce the equalized auxiliary and brake cylinder pressure when said brake cylinder and auxiliary reservoir are in communication.

6. In a braking apparatus, the combination with a brake cylinder, of electrically controlled means for supplying fluid under pressure to the brake cylinder, pneumatically controlled means for supplying fluid under pressure to the brake cylinder, said pneumatically controlled means comprising a triple valve device, a valve device adapted in one position to establish communication through which fluid under pressure is supplied to the brake cylinder by operation of said electrically controlled means and adapted in another position to establish communication through which fluid under pressure is supplied to the brake cylinder by operation of said pneumatically controlled means, valve means adapted in one position to establish communication through which fluid under pressure is supplied to the brake cylinder by operation of the electrically controlled means, and adapted in another position to establish communication through which fluid under pressure is vented to the atmosphere, and means independent of said triple valve device operative to control the movement of said valve means to vent the brake cylinder to the atmosphere when said pneumatically controlled means are operated to supply fluid under pressure to the brake cylinder.

7. In a braking apparatus, the combination with a brake cylinder, of electrically controlled means for supplying fluid under pressure to the brake cylinder, pneumatically controlled means for supplying fluid under pressure to the brake cylinder, a valve adapted in one position to establish communication through which fluid under pressure is supplied to said brake cylinder by the operation of said electrically controlled means and adapted in another position to establish communication through which fluid under pressure from the brake cylinder is vented to the atmosphere, pistons for operating said valve, a brake pipe, the pressure of fluid on both pistons being normally controlled by said electrically controlled means and the pressure on one of said pistons being controlled by a reduction in brake pipe pressure in effecting the operation of the pneumatically controlled means to supply fluid under pressure to the brake cylinder.

8. In a braking apparatus, the combination with a brake cylinder, of electrically controlled means for supplying fluid under pressure to the brake cylinder, pneumatically controlled means for supplying fluid under pressure to the brake cylinder, a valve adapted in one position to establish communication through which fluid under pressure is supplied to said brake cylinder by the operation of said electrically controlled means and adapted in another position to establish communication through which fluid under pressure from the brake cylinder is vented to the atmosphere, pistons for operating said valve, a brake pipe, the pressure of fluid on both pistons being normally controlled by said electrically controlled means, and valve means operative upon a reduction in brake pipe pressure, in effecting the operation of said pneumatically controlled means to supply fluid under pressure to the brake cylinder, for venting fluid under pressure acting on one of said pistons to the atmosphere.

9. In a braking apparatus, the combination with a brake cylinder, of electrically controlled means for supplying fluid under pressure to the brake cylinder, pneumatically controlled means for supplying fluid under pressure to the brake cylinder, a valve adapted in one position to establish communication through which fluid under pressure is supplied to said brake cylinder by the operation of said electrically controlled means and adapted in another position to establish communication through which fluid under pressure from the brake cylinder is vented to the atmosphere, pistons for operating said valve, a brake pipe, the pressure of fluid on both pistons being normally controlled by said electrically controlled means, and valve means operative upon a reduction in brake pipe pressure for venting fluid under pressure from the chamber containing one of said pistons until said valve establishes communication through which fluid under pressure in said brake cylinder is vented to the atmosphere.

10. In a braking apparatus, the combination with a brake cylinder, of electrically controlled means for supplying fluid under pressure to the brake cylinder, pneumatically controlled means for supplying fluid under pressure to the brake cylinder, a valve adapted in one position to establish communication through which fluid under pressure is supplied to said brake cylinder by the operation of said electrically controlled means and adapted in another position to establish communication through which fluid under pressure from the brake cylinder is vented to the atmosphere, pistons for operating said valve, a brake pipe, the pressure of fluid on both pistons being normally controlled by said electrically controlled means, and valve means subject to the pressure of fluid from the brake pipe for controlling the pressure of fluid on one of said pistons.

11. In a braking apparatus, the combination with a brake cylinder, of electrically controlled means for supplying fluid under pressure to the brake cylinder, pneumatically controlled means for supplying fluid under pressure to the brake cylinder, a valve adapted in one position to establish communication through which fluid under pressure is supplied to said brake cylinder by the operation of said electrically controlled means and adapted in another position to establish communication through which fluid under pressure from the brake cylinder is vented to the atmosphere, pistons for operating said valve, a brake pipe, the pressure of fluid on both pistons being normally controlled by said electrically controlled means, and valve means subject to pressure of fluid from the brake pipe for at one time reducing the pressure acting on one of said pistons and for at another time admitting fluid under pressure to said piston.

12. In a braking apparatus, the combination with a brake cylinder, of electrically controlled means for supplying fluid under pressure to the brake cylinder, a triple valve device operative to supply fluid under pressure to the brake cylinder, a brake pipe, valve means normally maintained in a position to establish communication through which fluid under pressure is supplied to the brake cylinder by the operation of said electrically controlled means, and means separate from said triple valve device operative upon a reduction in brake pipe pressure for controlling the operation of said means to close off the supply of fluid under pressure to the brake cylinder and establish communication through which fluid under pressure in the brake cylinder is vented to permit fluid under pressure to be supplied to the brake cylinder by the operation of said triple valve device.

13. In a braking apparatus, the combination with a brake cylinder, of electrically controlled means operative upon deenergization to supply fluid under pressure to said brake cylinder, a valve device adapted in one position to establish communication through which fluid under pressure is supplied to said brake cylinder by the operation of said electrically controlled means, a brake pipe, a triple valve device supplied with fluid under pressure from said brake pipe and operative upon a reduction in brake pipe pressure to supply fluid under pressure to said brake cylinder, means operative independently of said triple valve upon a reduction in brake pipe pressure for controlling the operation of said valve means to a position to establish communication through which fluid under pressure in the brake cylinder is vented to the atmosphere, and a valve subject to the pressure of fluid supplied by the operation of said triple valve device for closing off the last mentioned communication and establishing communication through which the fluid under pressure remaining in said brake cylinder and that supplied by the operation of said triple valve device will equalize.

14. In a braking apparatus, the combination with a brake cylinder, of electrically controlled means operative upon deenergization to supply fluid under pressure to said brake cylinder, a valve device adapted in one position to establish communication through which fluid under pressure is supplied to said brake cylinder by the operation of said electrically controlled means, a brake pipe, a triple valve device supplied with fluid under pressure from said brake pipe and operative upon a reduction in brake pipe pressure to supply fluid under pressure to said brake cylinder, means operative independently of said triple valve upon a reduction in brake pipe pressure for controlling the operation of said valve means to a position to establish communication through which fluid under pressure in the brake cylinder is vented to the atmosphere, a valve subject to the pressure of fluid supplied by the operation of said triple valve device for closing off the last mentioned communication and establishing communication through which the fluid under pressure remaining in said brake cylinder and that supplied by the operation of said triple valve device will equalize, and means for reducing the equalized pressure to a predetermined degree below the normal brake pipe pressure.

15. In a braking apparatus, the combination with means for controlling the brakes electrically and means for controlling the brakes pneumatically, the last mentioned means comprising a brake pipe and a triple valve device, valve means operative to change the control of the brake from electric to pneumatic and means independent of said triple valve device operative upon a reduction in brake pipe pressure for controlling the operation of said valve means.

In testimony whereof I have hereunto set my hand.

MILLARD C. ROWLEY.